Aug. 2, 1966 A. BILL ETAL 3,263,416
BY-PASS AIR DIVERSION TO LIFT FANS
Filed Aug 3, 1964 2 Sheets-Sheet 2

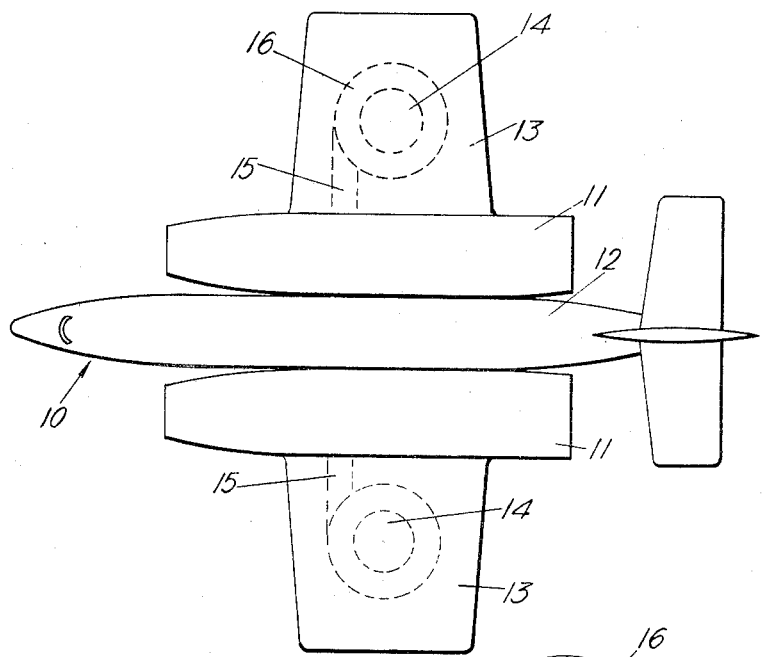
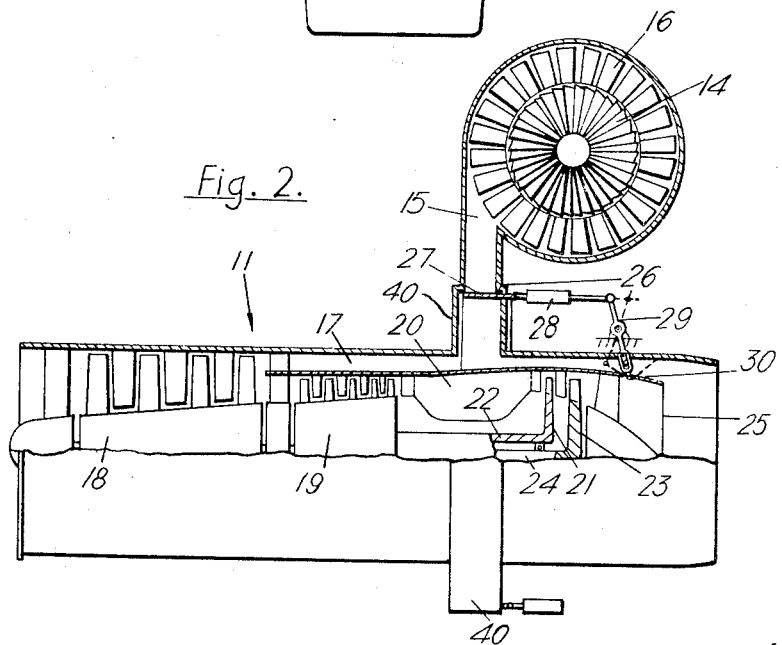

Inventors
Arthur Bill
Frederick Bowen Powell
By
Cushman, Darby & Cushman
Attorneys United States Patent Office 3,263,416
Patented August 2, 1966

3,263,416
BY-PASS AIR DIVERSION TO LIFT FANS
Arthur Bill, Derby, and Frederick Bowen Powell, Hathern, near Loughborough, England, assignors to Rolls-Royce Limited
Filed Aug. 3, 1964, Ser. No. 387,150
Claims priority, application Great Britain, Aug. 22, 1963, 33,365/63
20 Claims. (Cl. 60—35.6)

This invention relates to gas turbine engines of the by-pass type.

Throughout this specification the phrase "gas turbine engine of the by-pass type" is to be understood to mean a gas turbine engine in which at least part of the air compressed by a compressor of the gas turbine engine flows through a by-pass duct, by-passing the combustion equipment and turbine of the gas turbine engine, and subsequently forming part of the propulsive jet.

It is sometimes necessary temporarily to use all the by-pass air from an engine of the by-pass type in some auxiliary location of use, for example in driving auxiliary turbine driven fans or in operating flap-blowing or like devices. It is sometimes preferable if the air which is provided for these auxiliary devices can be of a higher pressure than that at which the by-pass air would normally be in the engine. The present invention provides a means whereby, simultaneously with the diversion of air to the auxiliary location of use, the compressor compressing the by-pass air is caused to over-speed, thus producing more highly compressed air for use at the auxiliary location.

According to the invention a gas turbine engine of the by-pass type comprises a bleed duct which communicates with the by-pass duct and which is adapted to convey by-pass air to a location of use, valve means by which the air from the by-pass duct may be caused to flow alternatively into said bleed duct or to the outlet of the by-pass duct, and a variable nozzle on the turbine outlet, the variable nozzle being operatively associated with the valve means so that the variable nozzle is opened when the valve means is positioned to allow air to pass through said bleed duct.

The valve means may comprise a first valve in said bleed duct and a second valve in said by-pass duct, said valves being operatively interconnected so that when one of said ducts is closed the other is open.

Said second valve may be combined with the variable nozzle in such a manner that, when the variable nozzle is in its open position it closes the by-pass duct. This is particularly convenient if the by-pass duct is an annular duct lying outside said variable nozzle.

Said first valve may comprise a ring which is axially slideable so as to cover or uncover an opening in the by-pass duct, the opening communicating with the bleed duct.

Alternatively said first and second valves may each comprise a number of inflatable bladders which when inflated combine to blank off their respective duct.

The bladders may be part segmental in shape when inflated and may be arranged to lie against the wall of the duct when deflated.

The two bladder-type valves may be connected alternatively to a source of high pressure air or to an outlet to atmosphere by way of a three position valve, the valve having an intermediate position in which the two valves are connected one to another.

The bleed duct may lead the by-pass air to the turbine of a turbine driven fan used for vertical or short take off and landing purposes.

The invention will now be described with reference to the drawings in which:

FIG. 1 shows a plan of an aircraft which incorporates two gas turbine engines according to the invention;

FIG. 2 is a partly sectioned plan view of a gas turbine engine according to the invention;

Figure 3:
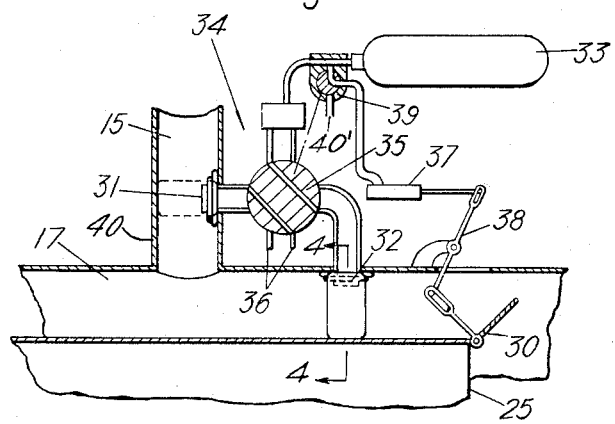
FIG. 3 is an enlarged section of part of an alternative embodiment of the invention.

Referring first to FIG. 1 an aircraft 10 is shown as having two engines 11 mounted on either side of its fuselage 12. The wings 13 of the aircraft project from the nacelles of the engines 11, and mounted in the wings are tip-turbine driven fans 14 which are driven by the action of air ducted from the engines 11 through ducts 15, the air from these ducts impinging upon the tip-turbines 16 and driving the fans 14.

As can be seen FIG. 2 the engines 11 are of the by-pass type, and it is the air which would normally flow through the by-pass duct 17 which is ducted through the duct 15 via an annular manifold 40 to drive the tip turbine 16. The by-pass engine 11 comprises a low pressure compressor 18, a high pressure compressor 19 which compresses part of the air from the low pressure compressor 18, the remainder of this air passing through the by-pass duct 17. Downstream of the high pressure compressor 19 is the combustion section 20 in which fuel is injected, by means not shown, and burnt. The burnt gas then passes through the high pressure turbine 21 which drives the high pressure compressor 19 through a shaft 22, and subsequently the gases pass through the low pressure turbine 23 which in turn drives the low pressure compressor by means of a shaft 24. The exhaust gases then pass through a variable exhaust nozzle 25 after which, in normal conditions, they join the by-pass gases which have passed through the by-pass duct 17.

When the aircraft 10 is required to take off vertically or in a short distance the fans 14 are used to produce direct vertical lift. For this condition the by-pass air must be deflected through the manifold 40 and the duct 15 and in order to do this it is necessary to provide valve means which blank off the by-pass duct 17 downstream of the entrance to the manifold 40. Additionally, for cruising flight, it is necessary to prevent air from the by-pass duct passing along the duct 15 and thus reducing the forward propulsive efficiency of the engine.

It is often advantageous if the by-pass air which is passed through the ducts 15 to the turbines 16 can be caused to be at high pressure than it would normally be under ordinary operating conditions of the engine. In order to achieve this, the variable nozzle 25 is arranged to be in its large-area position when air is being supplied through the duct 15. This causes the pressure downstream of the turbine 23 to drop, thus causing this turbine 23 to overspeed and to drive the low pressure compressor 18 at a higher speed than normal, producing a higher pressure in the by-pass air than is normal.

In order to achieve the diversion of the by-pass air, valve means are provided; one embodiment of these valve means is shown in FIG. 2 and another in FIG. 3.

In the embodiment of FIG. 2 a well-known type of valve 26 having a sliding ring-shaped valve member 27 is used to blank an annular manifold 40 which communicates with the duct 15. The valve member 27 is actuated by a series of rams 28, which may be hydraulic or pneumatic, so that in one position (as shown in the diagram) it prevents air from reaching the duct 15 and in a second position the valve member is moved, to the right as shown in the diagram, to allow free passage of gas through the duct 15.

A second valve is required to blank off the by-pass duct when the valve 26 is open. In the embodiment of FIG. 2 this variable nozzle 25 is used to blank off the duct 17 and thus to fulfill a dual purpose. A linkage 29 connects the actuating ram 28 with the petals 30 of the variable nozzle 25 so that when the valve 26 is closed the variable nozzle 25 is in its small-area condition and the by-pass duct 17 is unobstructed. This condition is shown in full lines in FIG. 2. When the valve 26 is opened by the actuating ram 28 the linkage 29 moves to the position shown in broken lines in FIG. 2 so that the petals 30 move so as to increase the area of the nozzle 25, and at the same time to block off the by-pass duct 17. Thus the variable nozzle 25 is used both to act as a valve in the by-pass duct 17 and also as a means for overspeeding the low pressure compressor 18.

In FIG. 3 is shown an alternative means of providing the two valves and the variable nozzle 25. In this embodiment inflatable bags 31 are used to block off the duct 15, and other inflatable bags 32 are used to block off the by-pass duct 17.

Figure 4:
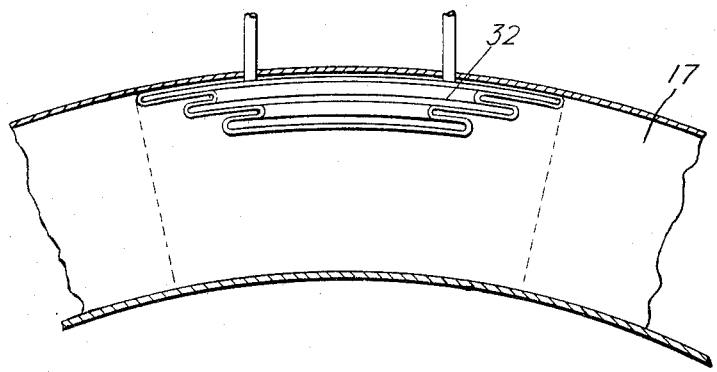
FIG. 4 is an enlarged section on the line 4—4 of FIG. 3.

As is best seen in FIG. 4 the bags 32, when in their deflated position, lie close to the wall of the by-pass duct and do not create very much disturbance in the air flow. When the bags are inflated they expand to the position shown in dotted lines in FIG. 4; thus each bag becomes part annular and blanks off part of the angular extent of the annular by-pass duct 17. Obviously, by providing sufficient bags 32 complete blockage of the by-pass duct 17 can be effected.

The bags 31 act in a similar fashion to the bags 32. In FIG. 3 only one bag 31 is shown and it is shown as extending to completely blank off the duct 15. However it is possible to provide a centre body in the duct 15 so as to make the duct 15 annular in cross-section, and then a series of bags similar to 32 can be used to blank off this annular duct.

The bags 31 and 32 are provided with compressed air for inflation from a compressed air bottle 33. The compressed air passes to the bags through a valve 34. The valve 34 is arranged to have three useful positions, achieved by the various angular positions of a movable part 35 with respect to a series of outlets and inlets in the valve body.

In the position shown in FIG. 3 compressed air from the bottle 33 is being supplied to the bags 32, while the bags 31 are vented to atmosphere through one of the vent pipes 36. If the movable member 35 is turned through 45° in an anti-clockwise direction the bags 32 and 31 become connected to one another, thus causing the partial inflation of the bags 31 and partial deflation of the bags 32. On turning the movable member 35 a further 45° in an anti-clockwise direction the bags 31 become connected to the bottle 33 and therefore completely inflate, while the bags 32 become connected to the vent pipes 36 and therefore completely deflate.

It will be seen that by arranging that the movable member 35 can only move through the range of motion described above, a certain saving of compressed air will be effected since the bags will only be partially inflated when they are connected to the vent pipes 36 and therefore only part of the air capacity of the bags will be lost to amosphere.

It is also necessary to provide actuating means for the variable nozzle 25. In FIG. 3 actuation of the petals 30 of the nozzle is effected by means of a ram 37 acting through a linkage 38. Compressed air from the bottle 33 may be passed to a ram 37 by way of a valve 39. The ram 37 may also be connected to atmosphere through the valve means 39 and vent pipe 40′. The valve 39 is operatively connected to the valve 34 (as indicated by the chain dotted line in FIG. 3) so that when the valve 34 is in the position shown in the diagram, the valve 39 passes compressed air to the ram 37 which therefore opens the nozzle 30. When the valve 34 is changed over so as to inflate the bags 31 and deflate the bags 32, the valve 39 vents the air from the ram 37 through the vent pipe 40 therefore causing the ram 37 to actuate the nozzle 25 to its small area position. Thus it will be seen that the operating mechanism for the bags 31 and 32 and the nozzle 25 has the same effect as that of the embodiment shown in FIG. 2.

Although the invention has been described throughout in relation to a by-pass engine which drives auxiliary tip-turbine driven fans at certain times, it is of course applicable to a by-pass engine which during some of its life has to drive various other devices, such as flap blowing devices, helicopter rotors etc.

Although both embodiments of the invention have been described as using mainly pneumatic actuation devices, it is of course possible to replace these penumatic devices by hydraulic devices or in some cases by solenoid operated devices.

We claim:
1. A by-pass gas turbine engine comprising: compressor means, combustion means and turbine means arranged in flow series; means drivingly interconnecting said turbine means with said compressor means; a jet pipe for receiving exhaust gases from said turbine means, said jet pipe having a discharge outlet; a by-pass duct having an inlet for receiving a portion of air compressed by said compressor means and an outlet for discharging the air as part of the propulsive jet; a bleed duct communicating with said by-pass duct intermediate the inlet and outlet of the by-pass duct for supplying by-pass air to an ancillary point of use; a first valve means for controlling communication between said by-pass duct and said bleed duct; a second valve means for controlling discharge of by-pass air from the outlet of said by-pass duct and for varying area of the discharge outlet of said jet pipe; and operating means operatively interconnecting said first and second valve means, said operating means being arranged to open said first valve means when said second valve means blocks discharge of air from the outlet of said by-pass duct and increases the area of said jet pipe so that a pressure drop occurs across said turbine means to thereby increase flow in said compressor means resulting in an increase of flow in the by-pass duct and the bleed duct over flow of by-pass air normally discharged from the outlet of said by-pass duct.

2. A by-pass gas turbine engine as claimed in claim 1 in which said second valve means includes a variable area nozzle at the outlet of the jet pipe which simultaneously increases the area of the jet pipe while decreasing the outlet of said by-pass duct.

3. A by-pass gas turbine engine as claimed in claim 2 in which said by-pass duct is annular and concentric with the variable area nozzle of said jet pipe.

4. A by-pass gas turbine engine as claimed in claim 3 in which said variable area nozzle comprises a plurality of axially extending flat members defining an annular nozzle piece, said flat members being hinged about their ends nearest said turbine means so that nozzle area formed by the ends of said flat members distant from their hinges may be varied by angular motion of the flat members about their hinges.

5. A by-pass gas turbine engine as claimed in claim 1 in which said by-pass duct includes an annular manifold and in which said bleed duct communicates with at least a portion of said annular manifold, said first valve means including an annular sleeve element surrounding said by-pass duct and axially slidable with respect to said duct into and out of said annular manifold so as to respectively block and unblock said bleed duct.

6. A by-pass gas turbine engine as claimed in claim 1 in which said first valve means includes an inflatable bladder means for blocking said bleed duct when inflated, and in which said second valve means includes inflatable bladder means in said by-pass duct and a variable area discharge nozzle on the outlet of said jet pipe.

7. A by-pass gas turbine engine as claimed in claim 1 including a turbine driven fan, said turbine driven fan communicating with the outlet of said bleed duct whereby air flowing through said bleed duct drives the turbine driven fan.

8. A by-pass gas turbine engine as claimed in claim 1 in which said by-pass duct includes an annular manifold, and in which said bleed duct communicates with at least a portion of said annular manifold; said first valve means including a plurality of inflatable bladders positioned in said manifold, said bladders being segmental in shape and when inflated combining to block off the bleed duct; said second valve means including a plurality of inflatable bladders positioned in said by-pass duct adjacent the outlet thereof and when inflated combining to block off discharge of air from the outlet of said by-pass duct and a variable area nozzle on the outlet of said jet pipe for increasing the outlet area when the bellows in said by-pass duct block off the discharge of by-pass air therefrom.

9. A by-pass gas turbine engine as claimed in claim 8 including a source of high pressure air, valve means operatively connecting the bellows in said bleed duct and the bellows in said by-pass duct to said source, said valve means having at least one position in which said bladders and said by-pass duct are inflated by said source and said bladders in said bleed duct are deflated and at least a second position in which said bladders in said bleed duct are inflated and said bladders in said by-pass duct are deflated.

10. A by-pass gas turbine engine comprising: a low pressure compressor, a high pressure compressor, combustion means, a high pressure turbine and a low pressure turbine arranged in flow series; means drivingly interconnecting said low pressure compressor with said low pressure turbine; means independent of said first mentioned driving means for interconnecting said high pressure compressor with said high pressure turbine; a jet pipe for receiving exhaust gases from said high and low pressure turbines, said jet pipe having an inlet for receiving a portion of the air compressed by said low pressure compressor and an outlet for discharging the air as part of the propulsive jet; a bleed duct communicating with said by-pass duct intermediate the inlet and outlet of the by-pass duct for supplying by-pass air to an ancillary point of use; a selectively operable valve in said bleed duct for controlling flow of air therein from said by-pass duct; a selectively operable means for blocking discharge of air from the outlet of said by-pass duct and for simultaneously increasing area of the outlet of said jet pipe; and operating means operatively interconnecting said valve with said selectively operable means whereby when said valve is opened to permit flow of air in said bleed duct from said by-pass duct, the discharge of air from the outlet of said by-pass duct is blocked and the area of the outlet of said jet pipe is increased to provide for a pressure drop across the low pressure turbine to thereby increase flow in said low pressure compressor resulting in an increase of flow in the inlet of the by-pass duct and into the bleed duct over flow of by-pass air normally discharged from the outlet of said by-pass duct.

11. A by-pass gas turbine engine as claimed in claim 10 in which said selectively operable means includes a variable area nozzle on said jet pipe arranged to increase area of the outlet of said jet pipe while blocking discharge of air from the outlet of said by-pass duct.

12. A by-pass gas turbine engine as claimed in claim 10 in which said selectively operable means includes a valve in said by-pass duct adjacent the outlet thereof and a variable area nozzle on said jet pipe, said valve in said by-pass duct and said variable area nozzle being interconnected.

13. An aircraft comprising: at least one by-pass gas turbine engine positioned to produce thrust for forward flight; at least one turbine driven fan positioned to produce vertical lift thrust; and means for selectively driving said turbine driven fan with by-pass air from said by-pass gas turbine engine.

14. An aircraft comprising at least one by-pass gas turbine engine positioned to produce thrust for forward flight and having a low pressure compressor, a high pressure compressor, combustion means, a high pressure turbine and a low pressure turbine arranged in flow series, a jet pipe, means drivingly interconnecting said low pressure turbine with said low pressure compressor, separate means drivingly interconnecting said high pressure turbine with said high pressure compressor, said by-pass gas turbine engine having a by-pass duct for receiving compressed air from said low pressure compressor and normally discharging the same as a portion of the propulsive jet; at least one turbine driven fan positioned to produce thrust for vertical lift; and means for selectively driving said turbine driven fan with by-pass air from said by-pass duct, said last mentioned means including means to cause a pressure drop across said low pressure turbine simultaneously with blockage of the discharge of by-pass air from said by-pass duct to thereby cause said low pressure compressor to overspeed and produce an increase of mass flow of air in said by-pass duct to said turbine driven fan without materially disturbing performance of the high pressure compressor.

15. An aircraft comprising at least one by-pass gas turbine engine positioned to produce thrust for forward flight and having a low pressure compressor, high pressure compressor, combustion means a high pressure turbine and a low pressure turbine arranged in flow series, a jet pipe, means drivingly interconnecting said low pressure turbine with said low pressure compressor, separate means drivingly interconnecting said high pressure turbine with said high pressure compressor, said by-pass gas turbine engine having a by-pass duct receiving air from said low pressure compressor and normally discharging the same as a portion of the propulsive jet; at least one turbine driven fan positioned to produce thrust for vertical lift; a bleed duct extending from said by-pass duct to said turbine driven fan for supplying by-pass air to drive the fan; a valve in said bleed duct and selectively operable to open and close the bleed duct to said by-pass duct; and means interconnected to and operated simultnaeously with said valve for blocking said bleed duct and increasing the discharge area of said jet pipe when said valve in said bleed duct is open.

16. An aircraft as claimed in claim 15 in which said means interconnected to and operated simultaneously with said bleed valve is a variable area discharge nozzle on said jet pipe, said nozzle when increasing the discharge area of said jet pipe also decreasing the discharge area of said by-pass duct.

17. An aircraft as claimed in claim 16 in which said variable area nozzle comprises a plurality of axially extending flat members defining an annular nozzle piece, said flat members being hinged about their ends nearest said turbine means so that the nozzle area formed by the ends of said flat members distant from their hinges may be varied by angular motion about their hinges into and out of the flow path of said by-pass duct.

18. An aircraft as claimed in claim 15 in which said means interconnected to and operated simultaneously with said bleed valve includes a valve in said by-pass duct adjacent its discharge end and a variable area nozzle on the discharge end of said jet pipe.

19. An aircraft as claimed in claim 18 in which said valve in said bleed duct and said valve in said by-pass duct are each at least one inflatable bladder member.

20. An aircraft as claimed in claim 15 in which said turbine driven fan includes a fan member and a tip turbine member surrounding and concentric with said fan member, said tip turbine member being operatively connected to said fan member upon impingement of by-pass air thereon.

References Cited by the Examiner

UNITED STATES PATENTS

| 3,019,600 | 2/1962 | Peek | 60—35.6 |
| 3,053,488 | 9/1962 | Cox | 60—35.6 |
| 3,108,767 | 10/1963 | Eltis | 60—35.6 |
| 3,118,276 | 1/1964 | Keenan | 60—35.6 |

FOREIGN PATENTS

| 1,306,025 | 9/1962 | France. |

MARK NEWMAN, *Primary Examiner.*

RALPH D. BLAKESLEE, *Examiner.*